Dec. 25, 1951     C. F. FLYNN     2,580,164
PHOTOGRAPHIC SLIDE VIEWER
Filed Jan. 31, 1950     2 SHEETS—SHEET 1
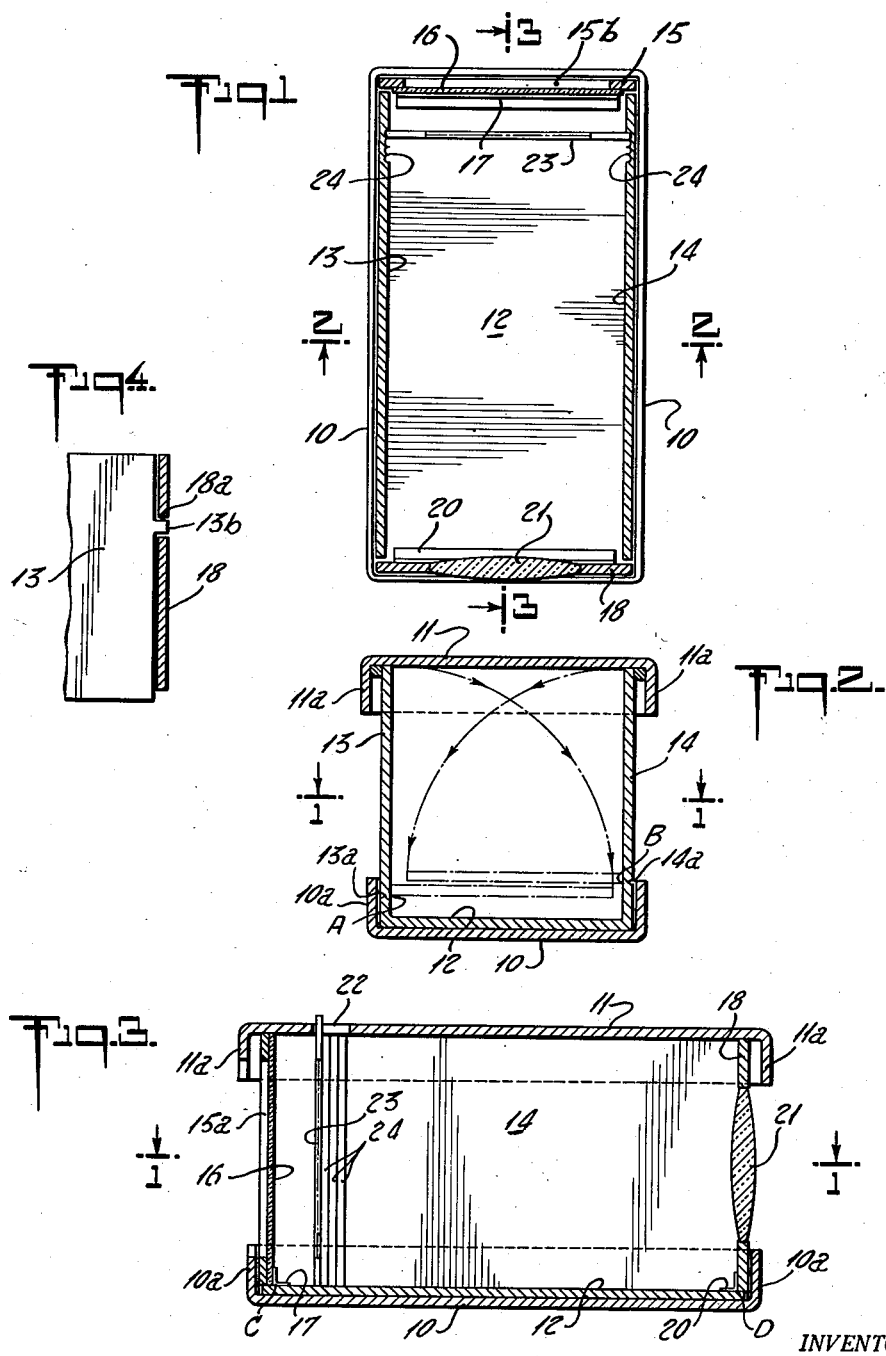
INVENTOR.
CHARLES F. FLYNN
BY
ATTORNEY Dec. 25, 1951 C. F. FLYNN 2,580,164
PHOTOGRAPHIC SLIDE VIEWER
Filed Jan. 31, 1950 2 SHEETS—SHEET 2
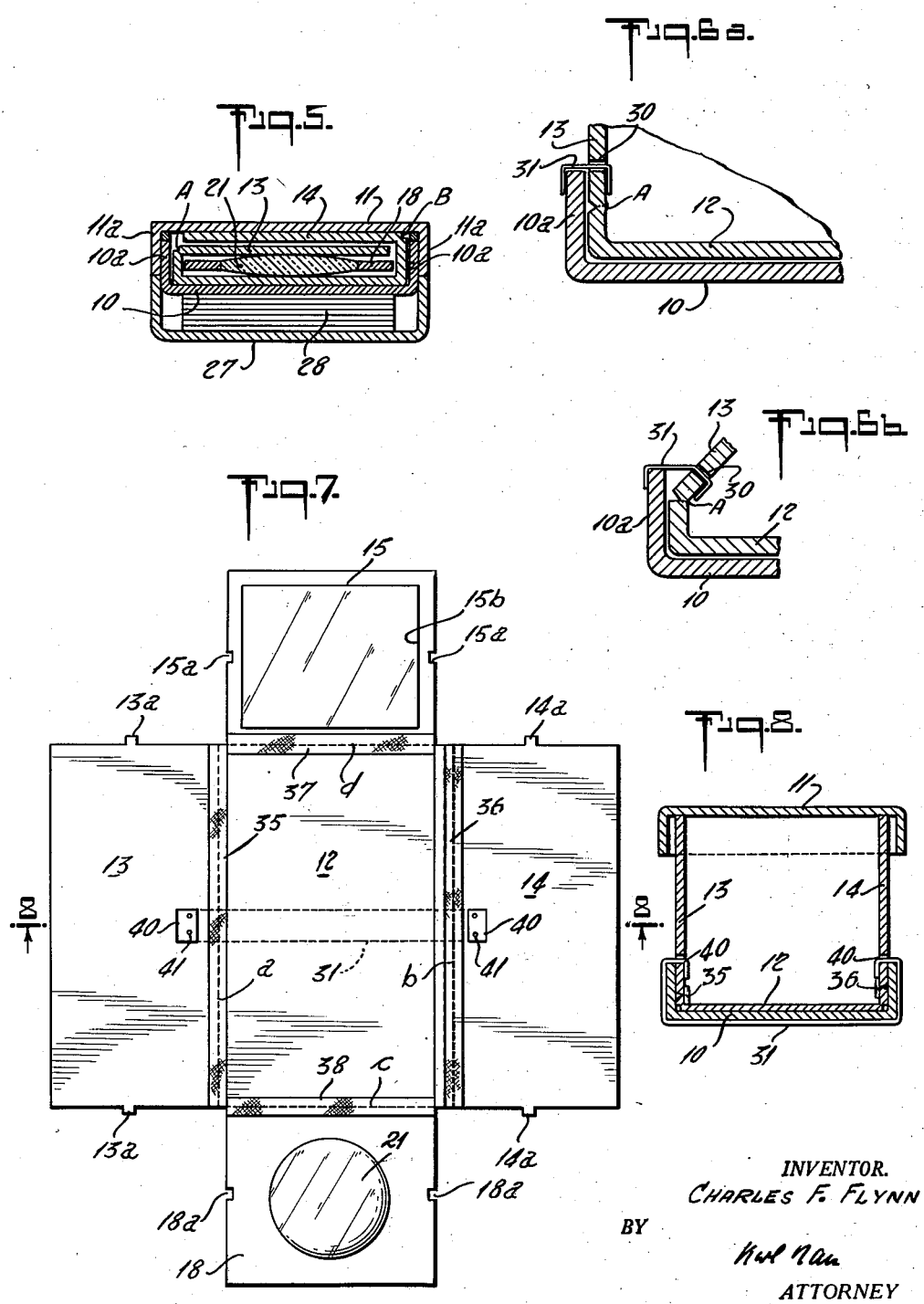
INVENTOR.
CHARLES F. FLYNN
BY
ATTORNEY

Patented Dec. 25, 1951

2,580,164

UNITED STATES PATENT OFFICE

2,580,164

PHOTOGRAPHIC SLIDE VIEWER

Charles F. Flynn, New York, N. Y.

Application January 31, 1950, Serial No. 141,405

6 Claims. (Cl. 40—64)

The present invention relates to photographic transparency or slide viewers and a method of making the same, more particularly to viewers of the general type comprising a light-tight box or casing with means for receiving or supporting a transparency or slide at or near a light admitting end wall of said casing and a magnifying lens mounted in the opposite end will, for viewing the picture on said slide or transparency by holding the device with the observer's eye close to said lens and with said first end wall pointed toward a suitable light source.

A main object of the invention is the provision of a transparency or slide viewer of the above character which, while of simple design and economical in manufacture, may be collapsed into a small space or compact shape suitable for convenient carrying in a person's pocket, and which can be instantly extended into operative position for viewing a slide or transparency.

A more specific object of the invention is the provision of a device of this character made of component parts which can be readily and cheaply manufactured and assembled, while at the same time maintaining an accurate relation between the elements of the viewer, to insure a clear and evenly illuminated transparency or picture.

Other objects of the invention are the provision of an improved viewer, especially suitable for viewing colour transparencies of the popular Kodachrome or similar type, the component parts of which may be fabricated and arranged for convenient assembly; which may be economically made by the use of non-metallic material such as cardboard, plastic sheet material or the like; and which is of simplified construction and arrangement adapted for easy manufacture at reduced cost and on a quantity or mass production scale.

The above and further objects as well as novel aspects of the invention will be better understood from the following detailed description of a preferred practical embodiment in connection with the accompanying drawings, forming part of this specification and wherein:

Figure 1 is a horizontal cross-section, taken on line 1—1 of Figure 2, through a slide viewer shown in the extended or operative position and constructed in accordance with the principles of the invention;

Figure 2 is a vertical cross-section of the viewer taken on line 2—2 of Figure 1;

Figure 3 is a further vertical cross-section taken on line 3—3 of Figure 1;

Figure 4 is a partial view showing a detail;

Figure 5 shows the viewer of the preceding views in the non-use or collapsed position;

Figures 6A and 6B are fractional views shown on an enlarged scale and illustrating an improved feature of the invention;

Figure 7 illustrates a simplified method of manufacturing a viewer according to the invention; and Figure 8 is a vertical cross-section similar to Figure 2 and illustrating a further modification of the invention.

Like reference characters identify like parts throughout the different views of the drawings.

Referring more particularly to Figures 1 to 5, the numeral 10 represents the bottom of a flat or shallow casing having upstanding side walls 10A and numeral 11 represents the top of said casing having depending side walls 11a closely fitting over the side walls 10a in the collapsed or non-use position of the device (see Figure 5).

The collapsible light box or dark chamber proper comprises, in the example shown, a bottom wall 12 which is firmly secured to the bottom 10 by gluing, pasting, or the like, and a pair of opposite side walls 13 and 14. The latter, in the extended or vertical position as shown, engage or bear against the side walls 10a, the latter acting as stops or abutments for the walls 13 and 14 which are hinged at A and B, respectively, in such a manner that they may be folded down against the bottom 12, as indicated in dot-dash lines in Figure 2 and shown in full lines in Figure 5.

In the embodiment shown in Figure 1, the bottom 12 and side walls 13 and 14 are made from a single element or sheet of cardboard or the like which is suitably bent at right angles, with the hinges A and B advantageously consisting of a pair of incisions or scoring lines 13a and 14a, respectively. As will be understood, however, the parts 12, 13, and 14 may be separate elements of any desired material and the hinges A and B may be of any suitable type or construction in accordance with the broader scope or spirit of the invention.

Similarly, there are provided a pair of front and rear walls 15 and 16 directly hinged to the bottom wall 12 at C and D, respectively, so as to be able to be folded down or collapsed against the bottom 12 in the non-use or inoperative position of the device (see Figure 5). The front wall 15 is provided with a light-admitting opening or cut-out 15b advantageously covered with a light diffusing member such as a ground glass 16 or a sheet of equivalent light diffusing material such as plastic or the like. The rear wall 18 has an opening to receive a magnifying lens 21 secured or mounted in any suitable manner. If the lens is made from plastic material it may be mounted by simply gluing or cementing it to the opening in the rear wall 18, as will be readily understood.

The hinges C and D may again be in the form of simple incisions or scoring lines if the walls 15 and 18 are made of cardboard or similar material. If the hinges are produced by scoring in the manner pointed out, they may be reinforced by means of canvas strips or the like as shown at 17 and 20, respectively, for the front and rear walls 15 and 18, respectively.

In order to hold the side walls 13, 14, 15 and 18 in exactly vertical position, the adjoining edges of adjacent walls may be provided with suitable interlocking elements such as shown in Figure 4. In the latter, the wall 13 is shown provided with a tongue or extension 13a adapted to engage a slot 18a in the wall 18 in the extended or vertical position of the walls. Similar tongue and slot arrangements 14a, 15a and 18a may be provided for locking the remaining side walls, in the manner shown in Figure 7.

After the side walls 13, 14, 15 and 18 have been extended from their collapsed position, Figure 5, into the vertical or extended position shown in Figures 3 and 4, the top 11 is applied as shown in Figure 3, whereby to provide a closed dark chamber or light box between the ground glass 16 and viewing lens 21. A slide such as a colour transparency 23 is then placed in position by inserting it in a slot 22 in the top 11, suitable guide grooves 24 being provided in the walls 13 and 14 for positioning the slide in a plane parallel to and properly spaced from the lens 21, to result in an even and clearly defined picture. By the provision of a plurality of grooves or guides 24, an observer is enabled to position the slide 23 at a desired distance from the lens 21, thereby enabling a sharp and correct focusing of the picture.

In order to collapse the viewer, all that is required is to remove the top 11, at first fold down the front and rear walls 15 and 18 so as to lie flat against the bottom 12, thereafter fold down the side walls 13 and 14 in proper sequence and to finally apply the top 11 to the bottom portion or casing 10, in a manner shown in Figure 5. If desired, the casing 10 may in turn be mounted or otherwise provided with a compartment or container 27 to provide a storage space for a number of slides or transparencies 28.

There is thus provided by the invention a slide viewer which in the inoperative or non-use position may be collapsed or folded to a compact unit of relatively flat or shallow shape, whereby to enable it to be conveniently carried in a person's pocket, and which may be instantly and readily extended into its operative position for demonstrating or viewing a slide or similar transparency. By a device of this type, the use and enjoyment of colour slides, especially those of the popular Kodachrome and similar types, is greatly enhanced. Amateurs are enabled to carry with them their preferred slides or pictures for showing them to friends or other persons interested, while professionals such as salesmen will be enabled to illustrate their products to prospective customers without having to carry heavy and elaborate projection equipment. Many other advantages and uses for a simple collapsible pocket viewer of the type according to the invention will be evident.

According to an improved feature of the invention, means are provided for automatically erecting or extending the side walls 13, 14, 15 and 18 upon removal of the top 11 which latter may engage the casing 10 in a tight or friction fit in the closed position. Alternatively, the top 11 may be locked by any suitable means or lock such as a snap fastener, clasp, or the like.

In order to effect an automatic erection of walls 13, 14, 15 and 18 in a simple manner, there is shown in Figures 6A and 6B a rubber band or equivalent resilient member 31 passed through a slot 30 in the wall 13 and having its inner end firmly secured to the inside of wall 13, while its outer end is secured to the adjacent side wall 10a of the casing 10. As a result, upon folding or collapsing the wall 13, the band 31 will be stretched or tensioned as shown in Figure 6B in such a manner, that upon release of the wall, i. e. upon removal of the top 11, wall 13 will be automatically rotated into its vertical position with the side walls 10a acting as a stop or abutment, in the manner described hereinabove. In a similar manner, the remaining side walls may be suitably spring loaded in the folded or collapsed position to result in an automatic erection or extension in the manner described.

As pointed out, a device according to the invention may be easily and economically manufactured from a single stamping of cardboard or the like, as shown more clearly in Figure 7. In the latter, the stamping comprising bottom wall 12 and side wall portions 13, 14, 15 and 18 is scored along lines a, b, c, and d. The lower portion of walls 13 and 14 are then bent into position and mounted in the casing 10 as shown in Figure 8. If desired, the scoring lines a, b, c and d serving as hinges for the side walls may be reinforced by strips of canvas 35, 36, 37 and 38 or the like, respectively.

According to a further improvement as shown in Figures 7 and 8, a single rubber band 31 may be provided for resiliently loading or tensioning both side walls 13 and 14 in the folded or collapsed position, said band being passed through slots 14 and having one end secured to the inside of wall 13, while its other end is secured to the inside of the wall 14 by any suitable means, such as rivets 41. In order to mount the casing 10, it is necessary merely to stretch and release the band 31 which additionally serves as a means for holding together the casing 10 and the collapsible light box members.

While there has been disclosed and described a desirable embodiment of the invention, it will be evident from the foregoing that changes in the size, shape and arrangement of parts, as well as the substitution of equivalent elements and steps for those disclosed herein, may be made without departing from the scope and spirit of the invention as set forth in the appended claims. The specification and drawings are accordingly to be regarded in an illustrative rather than in a limiting sense.

I claim:

1. A photographic slide viewer comprising a relatively flat casing having a bottom portion consisting of a bottom wall and integral upstanding side walls at right angle thereto and a top portion consisting of a top wall and integral depending side walls snugly fitting said side walls in the closed condition of said casing, a collapsible light chamber comprising a light-admitting front wall, a rear wall and a pair of side wall members each having its lower edge hinged to said bottom wall so as to be foldable against said bottom wall and erectable to upright positions limited by said upstanding side walls, said top portion being simultaneously adapted to form a closure for said chamber, a magnifying lens mounted in said rear wall, and means for positioning a photographic slide between said front and rear walls in the erected position of said chamber.

2. A photographic slide viewer comprising a relatively flat casing having separate complementary bottom and top portions, a collapsible light chamber comprised of a light-admitting front wall, a rear wall and a pair of side walls each having its lower edge hinged to said bottom portion so as to be foldable against said bottom portion and erectable to upright positions. resilient means interspaced between said walls and bottom portion, to normally urge said walls into erected position, said top portion being simultaneously adapted to form a top for said chamber, a magnifying lens mounted to said rear wall, and means for positioning a photographic slide between said front and rear walls in the erected position of said chamber.

3. A slide viewer as claimed in claim 2, wherein said resilient means consists of a rubber band having one end attached to said bottom portion and having its opposite ends attached to the respective wall of said light chamber.

4. A slide viewer comprising a relatively flat casing having a bottom portion consisting of a bottom wall and integral upstanding side walls and a top portion consisting of a top wall and integral depending side walls snugly fitting said side walls in the closed position of said casing, a collapsible light chamber comprising a light-admitting front wall, a rear wall and a pair of side walls each having its lower edge hinged to said bottom wall so as to be foldable against said bottom wall and erectable to vertical positions limited by said integral side walls, elastic members each having one end attached to one of said integral side walls and having its opposite end attached to the adjacent foldable wall, to normally urge said foldable walls into erected position, said top portion being simultaneously adapted to form a top for said chamber, a magnifying lens mounted in said rear wall, and means for positioning a photographic slide between said front and said rear walls in the erected position of said chamber.

5. A photographic slide viewer comprising a relatively flat casing having separate complementary bottom and top portions, said top portion having a transverse slot, a collapsible light chamber comprising a light admitting front wall, a rear wall and a pair of side walls each having its lower edge hinged to said bottom portion so as to be foldable against said bottom portion in the non-use condition of said viewer and being erectable to positions at right angle to said bottom portion in the operative position of said viewer, said top portion being simultaneously adapted to form a top for said chamber, a magnifying lens mounted in said rear wall, and guide means upon said collapsible side walls for positioning a photographic slide between said front and said rear walls and inserted through said slot.

6. A photographic slide viewer as claimed in claim 5 including resilient means interposed between said foldable walls and said bottom portion, to normally urge said walls into erected position of said chamber.

CHARLES F. FLYNN.

REFERENCES CITED

The following references are of record in the file of this patent:

UNITED STATES PATENTS

| Number | Name | Date |
|---|---|---|
| 1,796,432 | Barlatier | Mar. 17, 1931 |
| 1,957,716 | Koster | May 8, 1934 |
| 1,989,454 | Koster | Jan. 29, 1935 |
| 2,071,121 | Harlow | Feb. 16, 1937 |
| 2,403,747 | O'Gorman | July 9, 1946 |
| 2,461,718 | Bruno | Feb. 15, 1949 |

FOREIGN PATENTS

| Number | Country | Date |
|---|---|---|
| 600,954 | Great Britain | Apr. 23, 1948 |